United States Patent [19]

Hewlings

[11] 3,775,026

[45] Nov. 27, 1973

[54] PNEUMATIC LEVEL CONTROL

[76] Inventor: Winston G. Hewlings, Montreal, Quebec, Canada

[22] Filed: May 3, 1972

[21] Appl. No.: 249,917

[52] U.S. Cl. .................................. 417/36, 417/44
[51] Int. Cl. ...................... F04b 49/02, F04b 49/06
[58] Field of Search ............................. 417/36, 44

[56] References Cited
UNITED STATES PATENTS

| | | | |
|---|---|---|---|
| 1,987,466 | 1/1935 | Collin | 417/36 |
| 3,573,015 | 3/1971 | Canfield | 137/403 X |
| 3,431,858 | 3/1969 | Lynn | 417/36 X |
| 3,021,789 | 2/1962 | Ryden | 417/36 |
| 3,360,002 | 12/1967 | Weis | 137/395 |
| 3,393,642 | 7/1968 | Kordik | 417/36 |
| 3,424,090 | 1/1969 | Hyde | 417/44 X |

Primary Examiner—William L. Freeh
Attorney—Alan Swabey

[57] ABSTRACT

A pneumatic level control system for controlling the level of a flowable substance in a contained area. The system comprises a level control means having a first pneumatic level sensing means. Switching means are associated with the first level sensing means and operable by a first predetermined pressure in the first level sensing means to operate a transporting device connected to the contained area for transferring the substance. A second pneumatic level sensing means prevents the first predetermined pressure from building up in the first pneumatic level sensing means until the level of the substance reaches a further predetermined level.

4 Claims, 1 Drawing Figure

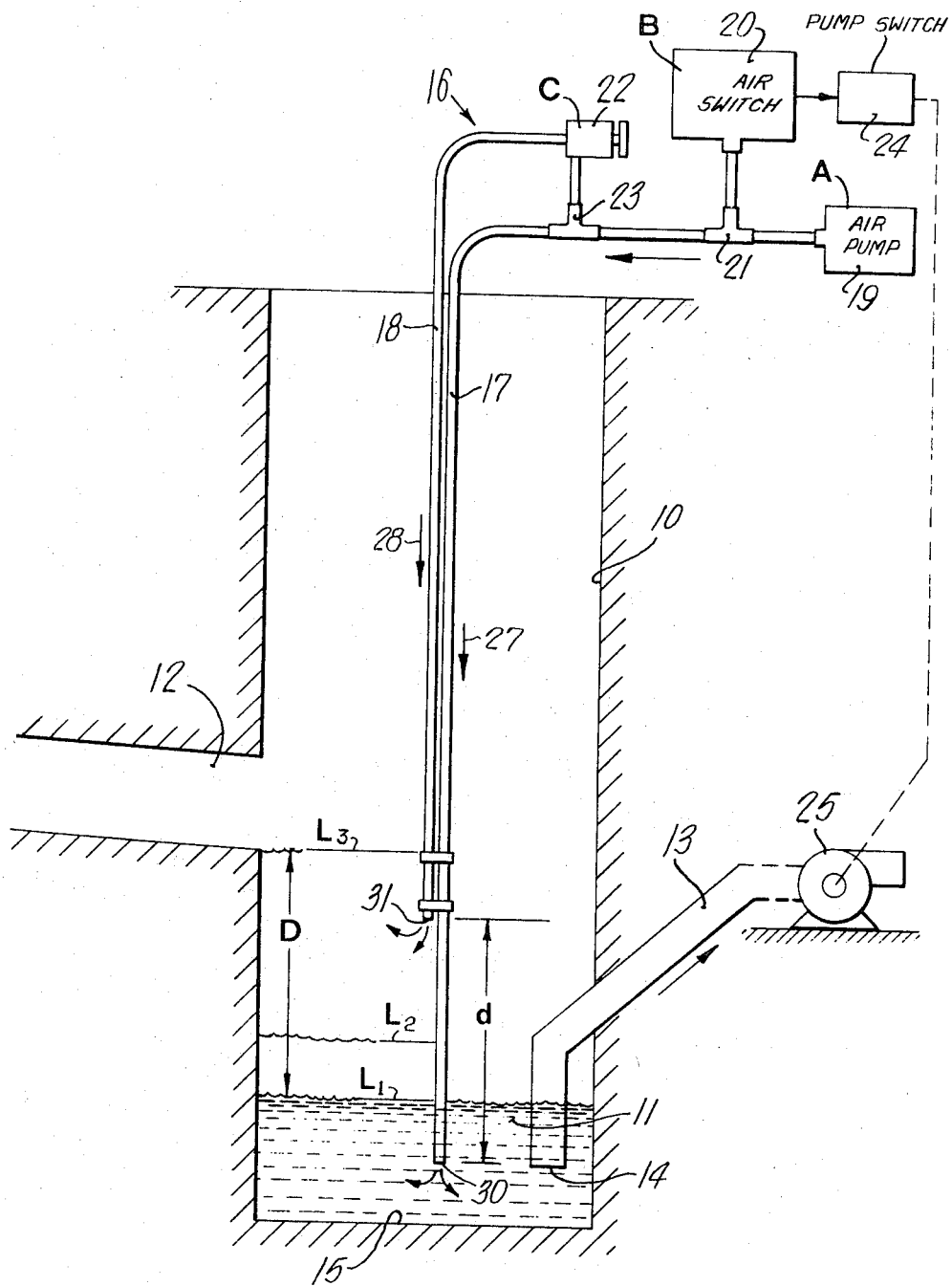

PNEUMATIC LEVEL CONTROL

BACKGROUND OF INVENTION

1. Field of the Invention

The present invention relates to a pneumatic level control system for controlling the level of a flowing substance being introduced into a containing area.

2. Description of Prior Art

Many of the level control apparatus presently used to control the operation of a pump to maintain predetermined levels of liquid in a containing area, such as a sump well for sewage sump application, utilize float mechanisms connected to shut-off valves or electrical contacts to start and stop an associated fluid pump connected to the well. These types of control have many disadvantages in that they are difficult to install or service, not very reliable because their operating components are subject to corrosion by the liquids in which they rest and their linkages become jammed by sewage or impurities in the liquid. Further, these are very unsanitary when requiring repair or installation.

SUMMARY OF INVENTION

It is a feature of the present invention to provide a pneumatic level control which substantially overcomes these above-mentioned disadvantages and which is economical to produce.

According to this feature, from a broad aspect, the present invention provides a pneumatic level control system for controlling the level of flowable substance in a contained area. The system comprises a level control means having a first pneumatic level sensing means. Switching means are associated with the first level sensing means and operable by a first predetermined pressure in the first level sensing means to operate a transporting device connected to the contained area for transferring the substance.

BRIEF DESCRIPTION OF DRAWING

A preferred embodiment of the present invention will now be described with reference to the accompanying drawing which is a schematic representation of the pneumatic level control system of the present invention.

DESCRIPTION OF PREFERRED EMBODIMENT

Referring now to the drawing, there is shown a contained area in the form of a sump or well 10 being fed with liquid substance 11 from a sewer discharge pipe opening 12. The sump or well 10 can be fed by any other suitable means located suitably relative to the contained area. A substance transporting device herein shown as a liquid pump 25 is provided with an intake pipe 13, of which the intake opening 14 is positioned a predetermined distance above the bottom surface 15 of the well 10. The pump 25 is turned "on" and "off" by level control means 16 whereby the well 10 will not overflow into the sewer discharge pipe and will periodically discharge from a second predetermined level $L_3$ to a first predetermined level $L_1$. $L_1$ is the predetermined lower level or stop level for the liquid in the well 10.

The level control means 16 comprises a first pneumatic level sensing means, herein shown as a hollow elongated conduit or pipe 17 extending partly down the well 10 below the discharge pipe opening 12. A second pneumatic level sensing means, also in the form of a hollow conduit or pipe 18, but shorter than pipe 17 by a predetermined distance "d," also extends down the well below the discharge pipe opening 12. An air pump 19 is connected to the end of the level sensing pipe 17 outside the well 10 and pumps air down the pipe 17 in the direction of arrow 27. A pressure sensing device 20 incorporating a differential switch 24, is conveniently connected to the pipe 17 via a T-coupling 21 located between the pump 19 and the liquid 11 in the well. An adjustable valve 22 connects the second level sensing pipe 18 to the pipe 17 via a further T-coupling 23 located in pipe 17 downstream from the air switch 20.

It is possible to provide a level control system with the first level sensing pipe 17, only.

The pressure sensing device 20 has a sensing diaphragm (not shown) which is adjustable and operates by predetermined pressures in the pipe 17. The air switch 20 also incorporates a differential switch 24. This particular switch 24 requires approximately twice as much pressure to operate than to release. When the sensing device 20 is operated, it causes an associated switch 24 to activate the pump 25. With valve 22 closed, when the liquid level inside the well 10 rises above the stop level $L_1$, the pressure builds up and at level $L_2$ sufficient pressure is present in the pipe 17 to cause the switch 24 to operate and the pump 25 would start. However, due to the differential feature contained in the switch 24 it would not reset until the level returns to $L_1$. The advantage of the delay to operate the differential switch 24 is that it prevents the pump 25 from being switched "on" and "off" momentarily and frequently, as the level of liquid increases very slightly above the stop level $L_1$. As the level of liquid 11 drops to the stop level $L_1$, the switch 24 is released, stopping the pump 25. As mentioned hereinabove, the reason why the switch 24 does not release immediately as the liquid level drops below level $L_2$ is that only half of the switch operating pressure is required to release the switch 24. Thus, the system may operate with the first level sensing means (level sensing pipe 17).

In the second and preferred application of the system utilizing pipes 17 and 18, when the valve 22 is open, some of the air being fed down the pipe 17 will bleed through the valve 22 and down pipe 18, in the direction of arrow 28, especially as the liquid level increases above the lower end 30 of pipe 17. Thus, as the liquid level continues to rise, air continues to bleed through the lower end 31 of pipe 18 and pressure does not build up in pipe 17 in the area of air switch 20 until the liquid level reaches the lower end 31 of pipe 18 and continues to rise until it reaches a predetermined start level $L_3$ where the pressure in the pipe 18 and also 17, via valve 22, has reached the pressure sufficient to operate the sensing device 20, which in turn activates the switch 24 and turns the fluid pump 25 "on." The start level $L_3$ or start pressure is adjustable by the valve 22 by adjusting the size of its connecting orifice. When the liquid level decreases, to the predetermined stop level $L_1$, the pressure in the pipe 17 has dropped to the predetermined pressure which turns "off" the fluid pump 25.

With the arrangement of level sensing pipes 17 and 18, it can be seen that the level control means can be easily adapted to wells of any depths. Also, the level difference "D" of liquid required to activate the fluid pump 25 can be adjusted by simply varying the distance "d," that is, the distance between the ends of pipes 17 and 18. Consequently, the distance "D" is adjustable.

It is within the ambit of the present invention to utilize the above-described level control system for applications other than the preferred one described herein. For example, the system could be used to control the level of a flowable substance such as a powder.

I claim:

1. A pneumatic level control system for controlling the level of a flowable substance in a contained area, said system comprising level control means having a first pneumatic level sensing conduit having one end extending below a predetermined lower level of substance in said contained area, a second pneumatic level sensing conduit connected to said first sensing conduit through an adjustable valve and having an end positioned above said lower level of substance below a second predetermined level, said second predetermined level being controlled by said adjustable valve, switching means connected to said first sensing conduit and operable by a first predetermined pressure in said first conduit after the level of substance has risen to said second predetermined level, said switching means controlling the operation of a substance transporting device connected to said contained area for transferring said substance, said switching means being released when the pressure in said first conduit reaches a second predetermined pressure which is lower than said first predetermined pressure.

2. A pneumatic level control system as defined in claim 1, wherein said first level sensing conduit has its other end connected to an air pump for pumping air down said first conduit for release under said lower level of said substance.

3. A pneumatic level control system as claimed in claim 1, wherein said switching means incorporates a differential air switch which is connected to control the operation of said transporting device, said transporting device being a pump connected to said contained area for transferring said substance.

4. A pneumatic level control system as claimed in claim 3, wherein said differential switch is operable by said first predetermined pressure which is approximately twice the force as said second predetermined pressure whereby said differential switch is released and said liquid pump is shut off.

* * * * *